July 21, 1964 A. MARSH 3,141,743
CRYSTALLIZATION PROCESS
Filed June 27, 1961
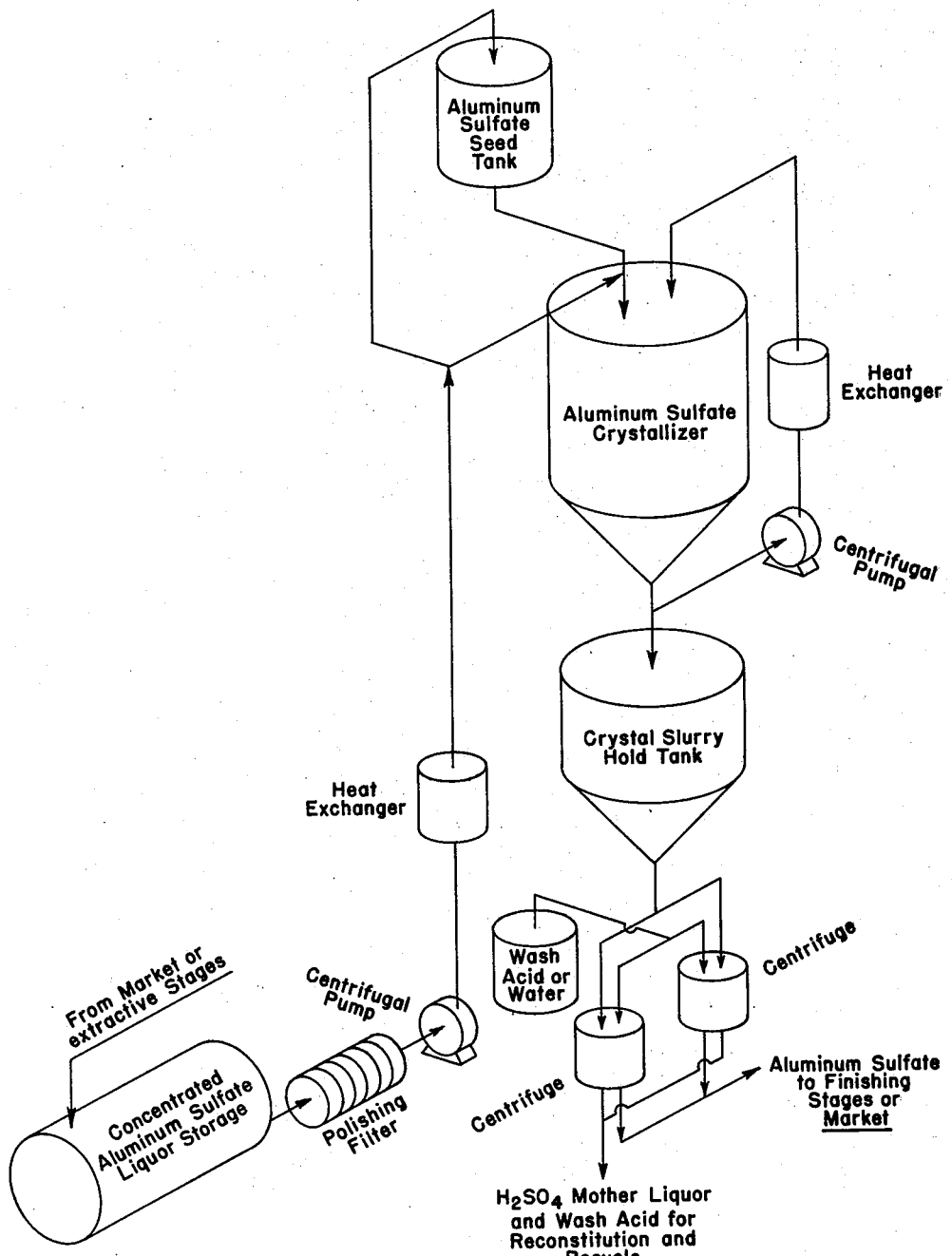
INVENTOR
Adam Marsh
BY
Charles J. Elderkin
ATTORNEY 3,141,743
CRYSTALLIZATION PROCESS
Adam Marsh, Niagara Falls, N.Y., assignor, by mesne assignments, to The North American Coal Corporation, a corporation of Ohio
Filed June 27, 1961, Ser. No. 119,859
17 Claims. (Cl. 23—301)

This invention relates, in general, to a new and improved process for the recovery, via crystallization techniques, of various sulfate salts of aluminum. More particularly, the invention involves the provisions of a unique crystallization mechanism for the separation and recovery of high-purity aluminum sulfates from relatively impure sulfuric acid solutions of the same, under conditions carefully controlled to promote enhanced filterability and recovery of the crystalline end-products from their residual mother liquors or crystal slurries. The process of the invention finds general application to the recovery of virtually all known stable salts of aluminum sulfate, including, for example, normal aluminum sulfate hydrates of the general composition $Al_2(SO_4)_3 \cdot XH_2O$; acid-containing hydrates of the general composition $$Al_2(SO_4)_3 \cdot YH_2SO_4 \cdot XH_2O$$

and co-crystallized mixtures of such hydrates, among others, from the basic system $Al_2(SO_4)_3 \cdot H_2SO_4 \cdot H_2O$ and from complex mixtures of the same containing as impurities various other metallic sulfates, and notably iron sulfates.

By way of general background information, it is to be noted that the crystallization mechanism of the invention finds particular utility as a component processing step within integrated operations involving extractive hydrometallurgical techniques for the production and recovery of aluminum sulfate via the sulfuric acid digestion of alumina-bearing materials including, by way of illustration, normal bauxite ores; high-silica, high-iron bauxite ores; alumina-bearing clays and shales; low-grade alumina-containing titaniferous iron ores; red mud residues from the Bayer alumina process; waste alumina-bearing overburdens and residues from coal mining and cleaning operations; alumina-containing furnace slags; natural silicates of aluminum; hydrous aluminum oxides and alums, among others. As one might deduce from the foregoing enumeration of starting materials, aluminum is the most plentiful common metal in the earth's crust, but significantly, the only commercial process for its production and recovery is directly dependent on the use as starting materials of high-grade bauxite deposits which are relatively scarce and scattered. Measures for the avoidance of this dependency have intrigued metallurgical researchers for many decades and, although the subject of countless publications, patents and technical proposals, many of which have been directed to sulfuric acid extraction techniques, it is further significant that no commercially feasible process has heretofore been placed in operation which actually overcomes this critical dependency on selective, high-grade starting materials. For the most part, such proposals have failed to meet with commercial success for the simple reason that none was able to operate on an economic and competitive basis with the existing practices in industry. Probably no other single factor has contributed as frequently to the failure of at least the sulfuric acid type of these projected extraction processes as the inability of prior researchers to achieve crystallization and separation of high-purity aluminum sulfate crystals from such systems on a realistic production basis.

That is to say, the crystal slurries produced via these various prior extractive techniques normally contain aluminum sulfate in the form of tiny, soft, mushy crystals, generally carrying large quantities of entrained impurities such as iron, and which are difficult and costly to separate from the impurities as well as from the crystal slurry, per se. In the latter connection, the crystals characteristically produced in accordance with such known techniques are extremely difficult to filter initially, or to subsequently wash, in that, they tend, quite rapidly, to coat all types of normal filtering media in the form of a compact, dense cake or mass which is virtually impervious to the normal passage through the filter of further quantities of the crystal slurry or wash liquors. Accordingly, it has proved substantially impossible, heretofore, to achieve reasonable filtration rates in the crystallization and washing stages of such processes.

It has been postulated by contemporaries in the field of the present invention that the filtration mechanism of aluminum sulfate crystal slurries of the general type described is essentially a function of crystal size, and that reasonable filtration rates and purity can only be obtained through the expedient of promoting crystal growth to the extent of deriving ultimate crystals measuring within the range of from ⅛-inch to 1/16-inch in diameter; the theory being that large crystalline masses of this type will tend to mitigate against the formation of the typical impervious filter-cake coatings encountered heretofore, and should, therefore, be more readily separable from the mother liquor by application of conventional filtering methods and apparatus. While this theory is in all probability quite accurate, it has been my experience that crystal growth to the recommended range indicated, requires a substantial expenditure in processing time, and is generally accompanied by some sacrifice in purity, as might be expected, in the sense that as the crystalline or solid phase increases in unit size the occlusion of impurities during growth occurs more readily. In addition, frequently the larger crystals are not truly individual crystals but mere aggregates of many crystals with the result that solid and liquid impurities become entrained therewith.

In direct contrast to the foregoing hypothesis, it is found that in the application of the process of the present invention to the treatment of crystal slurries containing aluminum sulfate crystals of average size ranging from merely 25–100 microns, one is able to attain excellent filtration rates, equally good washing properties for the resulting crystal cake, as well as the eventual recovery of extremely high-purity aluminum sulfate products. In brief, the foregoing unique results are achieved through the expediency of pre-conditioning merely a relatively small quantity of pregnant aluminum sulfate liquor, preferably obtained from the regular extractive stages of the process, under controlled conditions of cooling, agitation and aging to produce a crystal inoculum slurry or "seed bed" possessing substantially optimum filtration characteristics, which is then transferred to a suitable crystallizer vessel, followed by the controlled addition directly to this seed slurry of the remainder of the hot pregnant aluminum sulfate liquor from the extractive stages under conditions such that the aluminum sulfate from the pregnant liquor is deposited onto the seed bed with little or no new nucleation occurring. The crystallization operation is terminated when the overall crystals resulting from the addition of the main portion of pregnant liquor to the seed bed exhibit equivalently good filtration characteristics, following which the crystal magma is centrifuged or otherwise suitably filtered to separate the aluminum sulfate crystals from the mother liquor. The crystals may then be washed as required, and otherwise prepared for marketing, or further processing.

In actual practice of the crystallization process of the invention, it is found that the composition of the pregnant aluminum sulfate liquors derived from the primary extractive stages of a particular process will largely determine the form or composition of the specific sulfate salt or salts crystallized, and it is relatively immaterial whether the present process is practiced in conjunction with acid salt solutions or solutions of the normal hydrated salts or even mixed solutions containing several different salt forms in equilibrium, in that, essentially the same beneficial effects can be attained through the treatment of these solutions by the crystallization mechanism of the invention. In this connection, it is interesting to note that relatively little reliable data have been published heretofore with respect to the simple ternary system $$Al_2(SO_4)_3 \cdot H_2SO_4 \cdot H_2O$$

and even less information is available concerning the more complex mixtures of this system with contained salts of other metallic sulfates. In accordance with certain data elucidated concurrently with my research efforts, the extreme complexity of even the ternary system is exemplified by the fact that at least six different solid phases are known to exist therein, all of which may be produced at temperatures below 100° C. The system is further complicated by the fact that several solid forms may exist or be produced in conditions of either stable or metastable equilibrium. It is found, however, that in working with acidic aluminum sulfate solutions over a wide composition range and at varying temperatures, the unique crystallization mechanism of the present invention is effective in separating from these solutions aluminum sulfate crystals which can be filtered, washed and otherwise handled without difficulties of the type characteristically encountered with such solutions heretofore.

To further illustrate the foregoing, reference may be had to the copending application of Marvin J. Udy, deceased, Serial No. 198,380, entitled "Hydrometallurgical Process," which was filed on May 28, 1952; wherein there is described and claimed a relatively simple and efficient process for the sulfuric acid treatment of alumina-bearing materials of the general types enumerated hereinabove, to effect the direct production and selective recovery of normal aluminum sulfate hydrate of approximate composition: $Al_2(SO_4)_3 \cdot 16–18H_2O$, to the substantial exclusion of the acid salts of aluminum sulfate. In integrated operations involving use of the extractive mechanism of the process of the copending application in conjunction with the crystallization mechanism of the present invention, it is found that the pregnant aluminum sulfate liquors produced by the extractive mechanism of the Udy process form ideal feed solutions for direct use in the present process, and that crystallization of normal aluminum sulfate hydrate may be effected from these solutions by the present process to provide high-purity aluminum sulfate crystals possessing excellent filtering and washing characteristics. In a similar manner, acid aluminum sulfate solutions containing predominantly $$Al_2(SO_4)_3 \cdot H_2SO_4 \cdot 12H_2O$$

mixed solutions containing two or more crystalline aluminum sulfate phases, anhydrous aluminum sulfate, and various other crystalline solid phase aluminum sulfate products have been recovered from concentrated feed solutions by direct application of the crystallization mechanism of the invention with attendant beneficial handling properties and enhanced purity being exhibited by all of the resulting crystals.

The precise mechanism underlying the crystallization process of the invention is not known, but exhaustive X-ray studies conducted in conjunction with specimens consisting of single crystals and intact filter cakes from both the present process as well as typical poorly-filterable cakes recovered by known crystallization methods, demonstrate that the beneficial results attained by practice of the process of the invention are not attributable to crystal size, per se. Rather, the filter cake X-ray studies indicate that the crystals produced in accordance with the technique of the present invention become preferentially oriented when ultimately laid down on a filtering medium, such that permeability or porosity is preserved between crystals and between adjacent monocrystalline layers in spite of cake thicknesses of several inches. In contrast thereto, with crystals produced by normal crystallization procedures, the filter cakes become substantially non-porous at relatively shallow depths and are totally devoid of the characteristic orientation lines detected in the X-ray patterns obtained with typical filter cake specimens of the present invention. Attempts to elucidate the precise mode of this orientation phenomenon, i.e., in terms of the crystal planes involved, by single crystal studies proved fruitless in view of the small size of the crystals involved and undesirable aging effects encountered during the time necessary to complete the X-ray patterns.

It is believed that a more complete understanding of the principles and procedures of the invention will be gained by referring to the following detailed description thereof, taken in conjunction with the single drawing, which contains a flow sheet or flow diagram depicting in schematic form the various steps in the process as explained hereinafter.

In the practice of the process of the invention, the preparation of the seed bed is effected by taking a portion of the pregnant aluminum sulfate feed liquor ranging from 5–20 percent, by volume, but preferably about 10 percent by volume, and passing it at an elevated temperature into the seed preparation tank. The actual temperature of the feed liquor is relatively non-critical so long as it is maintained above the temperature at which crystallization occurs for the particular aluminum sulfate concentration involved. In actual practice, however, we prefer to operate at temperatures above approximately 54° C. In order to avoid undue nucleation in the crystallization operation, it is found to be desirable to filter the pregnant liquor through a polishing filter, so that a sparkling clear solution is obtained for the crystallizer feed. Within the seed preparation tank, the small portion of pregnant aluminum sulfate liquor is rapidly cooled, with agitation, to a temperature within the range of from 7–43° C. For economic reasons, it is preferred that refrigeration be avoided and that the cooling mechanism be effected at temperatures within the range of normal cooling media, namely 26–33° C. Agitation and cooling are then continued for a conditioning period of from 4 to 20 hours, and preferably for about 6–10 hours, to produce the master inoculum slurry for the main crystallization operation. Of course, as will be readily apparent it is entirely feasible to conduct the seed preparation directly within the main crystallizer vessel, but for ease of handling and by reason of equipment limitations, it is found to be more desirable to proceed in the manner outlined above.

Upon completion of the seed bed conditioning period, the resulting inoculum slurry is transferred directly to the main crystallizer vessel, wherein crystallization is effected by feeding the remainder of the pregnant aluminum sulfate solution directly onto the inoculum slurry under conditions of continued agitation. Since heat must be continuously removed, cooling is continued throughout the crystallization cycle, such that the temperature of the crystallizer is maintained at approximately 26–33° C. In actual practice, it is found to be advantageous to control the rate of feed of the pregnant liquor to the crystallizer vessel; generally, a rate of feed of the order of from 5–20 volume percent per hour of the main portion of the pregnant liquid results in the deposition of the aluminum sulfate onto the inoculum crystals with little or no additional nucleation occurring. Depending upon the precise composition of the feed liquor, the acid strength will be increased during crystallization due to the removal of water of crystallization in the crystallized aluminum sulfate, and this mechanism can be used to advantage in processes in which the residual mother liquor must be reconstituted and reused in the extractive stages of the process.

Upon completion of the addition of the main portion of the sulfate liquor to the seeded crystallizer vessel under the conditions specified, it will be found that the resulting crystals exhibit good drainage characteristics, and the slurry is then centrifuged or otherwise filtered to separate the aluminum sulfate crystals from the residual mother liquor. Preferably, washing of the crystals to remove impurities is conducted directly within the centrifuge by the addition of a suitably constituted wash liquor. In this connection, my investigations have demonstrated that most of the impurities (primarily ferrous iron) present on the aluminum sulfate filter cake are dissolved in residual mother liquor wetting the crystals, such that with a proper washing technique, the mother liquor can be displaced and a product low in iron can be obtained. When sulfuric acid is employed as the washing medium, in order to minimize re-solubilization of the aluminum sulfate, excellent results can be obtained with a solution concentration of approximately 30–50 percent by weight sulfuric acid. In general, the stronger the acid employed for washing purposes, the more acid will be left on the filter cake, and since a slightly basic product is desired in commerce, the optimum acid wash solution is best constituted below approximately 46 percent by weight sulfuric acid.

The washed crystals are then removed from the centrifuge and may be further processed as required for marketing or other end-use. The mother liquor and wash acid from the centrifuging operation are fortified as required by the addition of fresh concentrated sulfuric acid, and may then be recycled directly to the extractive stages of the process.

As will be readily apparent to the skilled technician, the process of the invention is readily adaptable to continuous crystallization operations as well as batch-type operations. In operations of the former type, I have found that continuous seed additions can be effected simultaneously with the addition of pregnant liquor to the crystallizer vessel, and continuous recovery of proper crystal slurry effected from the crystallizer. Thus, after establishing the volume of the crystal slurry at an optimum for the crystallizer unit involved, it is found that the addition of pregnant liquor and seed slurry in a ratio of from approximately 4–19 to 1, respectively, with simultaneous withdrawal of an equivalent colume of crystal slurry from the crystallizer, yields crystals of entirely satisfactory properties.

The following examples and related data illustrate the specific application of the foregoing principles and procedures in the production of crystalline aluminum sulfate from typical pregnant liquors of the general class defined hereinbefore:

EXAMPLE I

A series of eight (8) production runs were conducted within a large scale pilot plant installation designed in accordance with the extractive processing technique of copending application Serial No. 198,380. The pilot plant was run on a batch basis utilizing as a raw starting material 1000 pounds of ground coal mine overburden per batch, under leaching conditions controlled to produce pregnant aluminum sulfate liquors for use as crystallizer feed solutions.

In each instance, the separate batches of crystallizer feed were passed through a polishing filter, following which 10 percent by volume of the hot (65° C.) pregnant liquor was passed to a seed bed preparation tank wherein the slurry was cooled to 26° C., agitated constantly, and conditioned by aging for periods ranging from 6–10 hours. Thereafter, the seed bed slurries were transferred to a larger crystallizer vessel in which continued agitation and the same temperature conditions were maintained while the additional 90 percent by volume of each feed batch was fed into the crystallizer vessel. The additions of the main portions of the feed solutions were controlled to provide a feed to seed ratio approximating 0.03 volume of pregnant liquor per minute per volume of seed slurry.

Following completion of each addition, the crystallizer contents were centrifuged to effect separation of the crystal product from the residual mother liquor. Thereafter, the crystals were washed within the centrifuge with a 46 percent sulfuric acid solution.

The following tabulated data summarize the essential results of these production runs:

*Table I*

WEIGHT BALANCES (LBS.)—CRYSTALLIZATION AND CENTRIFUGATION

| Stream | Run No. | | | | | | | |
|---|---|---|---|---|---|---|---|---|
| | 1 | 2 | 3 | 4 | 5 | 6 | 7 | 8 |
| Pregnant-Liquor | 5,902 | 5,010 | 4,796 | 5,451 | 4,801 | 5,475 | 5,012 | 4,637 |
| Wash Acid | 150 | 234 | 266 | 323 | 300 | 373 | 327 | 291 |
| Total Input | 6,052 | 5,244 | 5,062 | 5,774 | 5,101 | 5,858 | 5,339 | 4,928 |
| Crystal Product | 857 | 897 | 654 | 1,242 | 899 | 1,314 | 924 | 829 |
| Mother Liq. + Wash | 2,261 | 3,019 | 2,737 | 3,654 | 3,495 | 4,193 | 3,967 | 3,637 |
| Total Output | 3,118 | 3,916 | 3,391 | 4,896 | 4,394 | 5,507 | 4,891 | 4,466 |

Table II
ANALYSES OF CRYSTALLIZER AND CENTRIFUGE LIQUORS

| Run No. | Crystallizer Feed | | | | Mother Liquor Plus Wash | | | |
|---|---|---|---|---|---|---|---|---|
| | Percent $H_2SO_4$ | Percent $Al_2O_3$ | Percent $Fe_2O_3$ | $Fe_2O_3/Al_2O_3$ | Percent $H_2SO_4$ | Percent $Al_2O_3$ | Percent $Fe_2O_3$ | $Fe_2O_3/Al_2O_3$ |
| 1 | 37.10 | 4.13 | 0.43 | 0.10 | 40.92 | 0.92 | 0.57 | 0.62 |
| 2 | 34.55 | 3.76 | 0.45 | 0.12 | 38.74 | 0.91 | 0.53 | 0.58 |
| 3 | 32.22 | 4.28 | 0.49 | 0.11 | 39.23 | 1.15 | 0.55 | 0.48 |
| 4 | 32.51 | 4.23 | 0.51 | 0.12 | 37.85 | 1.07 | 0.58 | 0.54 |
| 5 | 32.01 | 4.00 | 0.50 | 0.13 | 41.40 | 1.28 | 0.56 | 0.44 |
| 6 | 33.62 | 4.06 | 0.53 | 0.13 | 37.67 | 0.91 | 0.56 | 0.62 |
| 7 | 33.70 | 4.12 | 0.63 | 0.15 | 38.64 | 1.22 | 0.64 | 0.52 |
| 8 | 34.22 | 3.87 | 0.58 | 0.15 | 38.78 | 1.08 | 0.66 | 0.61 |

Table III
ANALYSES OF CRYSTAL PRODUCTS [$Al_2(SO_4)_3 \cdot 16$–$18H_2O$]

| Run No. | Percent $Al_2O_3$ | Percent $Fe_2O_3$ | $Fe_2O_3/Al_2O_3$ | Total Wt. |
|---|---|---|---|---|
| 1 | 12.69 | 0.065 | 0.0051 | 857 |
| 2 | 12.98 | 0.100 | 0.0077 | 897 |
| 3 | 12.23 | 0.100 | 0.0082 | 654 |
| 4 | 12.47 | 0.100 | 0.0080 | 1,242 |
| 5 | 13.68 | 0.037 | 0.0027 | 899 |
| 6 | 12.63 | 0.070 | 0.0055 | 1,314 |
| 7 | 13.62 | 0.036 | 0.0026 | 924 |
| 8 | 13.64 | 0.040 | 0.0029 | 829 |

The crystal products recovered in Runs Nos. 2 and 3 were further analyzed for minor impurities yielding the following results:

Table IV

| Run No. | 2 | 3 |
|---|---|---|
| Percent $K_2O$ | 0.130 | 0.380 |
| Percent $Na_2O$ | 0.023 | 0.050 |
| Percent CaO | 0.016 | 0.003 |
| Percent MgO | 0.070 | 0.080 |
| Percent $SiO_2$ | 0.002 | 0.001 |

With reference to the foregoing tabulated data, it is interesting to note the extreme purity of the crystalline products produced by the crystallization mechanism of the invention; representing with respect to iron, for example, a ten-fold increase over the purity normally specified for commercial grades of aluminum sulfate. The ratio of iron oxide to aluminum oxide in the crystal product as shown in Table III as compared with the same ratio for the pregnant liquor (Table II) further demonstrates the unusual purifying action of the crystallization process of the invention. The corresponding increase for this ratio in the mother liquor offers conclusive proof of the selective rejection of such impurities from the crystal products recovered.

EXAMPLE II

In order to demonstrate the improved filtering characteristics of the crystals produced by the crystallization mechanism of the invention, a typical seed bed slurry of aluminum sulfate octadecahydrate [$Al_2(SO_4)_3 \cdot 18H_2O$] was prepared from a portion equivalent to about 8 percent by volume of a pregnant solution $$[10\% \; Al_2(SO_4)_3 - 49\% \; H_2SO_4]$$

by cooling (21° C.), agitating and aging the solution fraction for six (6) hours. The seed slurry was then transferred to a larger volume crystallizer vessel to which the remainder of the pregnant liquor was gradually added over a six and one-half (6.5) hour period.

At periodic intervals, the relative filterability and cake weight of the crystals were determined with the following results:

Table V

| Time [1] | Filterability | |
|---|---|---|
| | Filtrate Volume [2] | Cake Weight [3] |
| 0 Hrs. (Seed Crystals) | 185 | 40 |
| 0.5 Hr | 225 | 57 |
| 1.0 Hrs | 268 | 80 |
| 1.5 Hrs | 310 | 115 |
| 2.0 Hrs | 308 | 117 |
| 3.0 Hrs | 372 | 192 |
| 4.0 Hrs | 342 | 154 |
| 5.0 Hrs | 390 | 183 |
| 6.0 Hrs | 342 | 147 |
| 6.5 Hrs | 312 | 132 |

[1] Hours after start of addition of main solution portion to seed crystals.
[2] Volume in cubic centimeters of filtrate obtained by immersing a filter of 0.1 ft.² surface area into the crystal slurry and applying a vacuum of 10 inches mercury for 36 seconds.
[3] Weight in grams of wet $Al_2(SO_4)_3 \cdot 18H_2O$ obtained under the conditions specified in (1) and (2).

The increase in relative filterability leveled off at about five (5) hours, at which point the crystal size averaged approximately 50 microns. The data substantiate the fact that the enhanced filterability obtained with the crystalline end-products of the invention is not a function of crystal size, per se.

EXAMPLE III

A pregnant solution of aluminum sulfate containing 14% $Al_2(SO_4)_3$ and 60% $H_2SO_4$ was subdivided into two fractions of approximately 10 and 90 percent by volume. The lesser fraction was cooled to 25° C., and agitated and aged for 7.5 hours to produce a seed bed inoculum.

The remainder of the sulfate solution was then fed to the seed bed at a rate of 8 volume percent per hour until exhausted, at which point the slurry was separated by centrifuging from the mother liquor. The resulting crystals were found to possess excellent filtration characteristics and were determined by X-ray diffractomer studies to correspond to the composition:

$$Al_2(SO_4)_3 \cdot H_2SO_4 \cdot 12H_2O.$$

EXAMPLE IV

A pregnant aluminum sulfate liquor containing 9.9% $Al_2(SO_4)_3$ and 47.5% $H_2SO_4$ was sub-divided into six (6) separate fractions, each of which was then subjected to a different crystallization operation including (1) conventional cooling, (2) conventional cooling coupled with simple solution seeding, and four different seed bed crystallizations performed according to the process of the present invention in which the seed bed conditioning period and agitation during crystallization were varied to determine the effects of these parameters on the process. The comparative results of all six crystallizations were measured in terms of relative filtration rates obtained with the resulting crystals utilizing a vacuum, rotary drum filter operated at ½ r.p.m. with 20 inches Hg form vacuum and 25 inches Hg dry vacuum. The results of these tests are presented in tabulated form below;

and indicate the magnitude of the improvement obtained by the seed bed technique of the invention:

Table VI

| Run No. | Agitation | Type of Crystallization | Seed Bed Conditioning Period, Hours | Filtration Rate, Lbs./Ft.²/Hour |
|---|---|---|---|---|
| 1 | Yes | Conventional Cooling | None | 77 |
| 2 | Yes | Conventional Cooling with simple solution seeding. | None | 54 |
| 3 | Yes | Seed bed technique | 8 | 211 |
| 4 | No | do | 8 | 135 |
| 5 | Yes | do | 6 | 150 |
| 6 | Yes | do | 4 | 96 |

EXAMPLE V

A series of seven (7) seed-bed crystallization experiments were conducted in which the ratio of feed to seed and crystallization time were varied to determine the effects of these variables on the quality of crystals recovered, as measured in terms of filterability of the same.

In all instances, a pregnant aluminum sulfate liquor was prepared, filtered to remove solid contaminants, and then separated into two portions of approximately 10 and 90% by volume.

To form the inoculum slurries or seed beds, the smaller portions were placed in beakers in a cold bath maintained at 15–20° C. and stirred for the entire aging period. Following completion of the seed beds, additions of hot (approximately 75° C.) pregnant liquor were made at regular intervals over a period of several hours while the crystal slurry was maintained at approximately 26–33° C. At the end of the desired period, one or several leaf filtration tests were made to determine the volume of filtrate and mass of crystals that could be separated in a given time under a given vacuum. In all tests the cake was formed using 10 inches of mercury vacuum for fifteen (15) seconds and then dried at full vacuum for two minutes.

The results of these tests are shown in tabulated form in Table VII below, which includes the experiment number, hours of seed conditioning, milliliters of seed at the start, milliliters of pregnant liquor added per minute, hours of additions, milliliters of filtrate separated, and grams of crystals recovered.

By reference to these data it will be seen that experiments Nos. 1–3 yielded the best results, ranging from 280 to 355 ml. of filtrate and from 167 to 225 grams of crystals separated after five (5) hours of crystallization. The results following three (3) hours of crystallization are somewhat poorer, ranging from 210 to 266 ml. of filtrate and from 105 to 150 grams of crystals recovered.

The optimum feed rate as utilized in experiments Nos. 1, 2, 3 and 7 is 0.03 ml. of pregnant liquor per minute per milliliter of seed. The rate used in experiment No. 6 was 0.06, and in experiment No. 4 was 0.12 and 0.06 ml. of feed per minute per milliliter of seed. In most of the tests included in this program, crystallization was continued with the remaining slurry, additional pregnant liquor being added during this time, but little or no change was encountered beyond the cycles actually reported in the table.

Table VII

| Experiment Number | Hours Seed Aging | Ml. Original Seed | Ml. Pregnant Liquor per minute | Period of Pregnant Liquor Addition, Cumulative Hours | Filtration test | | |
|---|---|---|---|---|---|---|---|
| | | | | | Test No. | Ml. Filtrate | Grams Crystals |
| 1 | 8 | 535 | 16 | 3 | 1 | 252 | 105.5 |
| | | | | | 2 | 266 | 150.4 |
| | | | | | 3 | 255 | 146.3 |
| | | | | 5 | 1 | 355 | 224.6 |
| | | | | | 2 | 335 | 212.0 |
| 2 | 8 | 535 | 16 | 3 | 1 | 210 | 122.6 |
| | | | | | 2 | 210 | 118.5 |
| | | | | 5 | 1 | 280 | 167.4 |
| | | | | | 2 | 300 | 173.3 |
| 3 | 8 | 268 | 8 | 6 | 1 | 288 | 182.0 |
| | | | | 7 | 1 | 310 | 195.3 |
| | | | | 8 | 1 | 178 | 108.3 |
| 4 | 8 | 67 | 8 | 5 | 1 | 75 | 32.0 |
| | | | | | 2 | 53 | 30.3 |
| | 8 | 134 | 8 | 5 | 1 | 115 | 66.0 |
| | | | | | 2 | 105 | 63.0 |
| 5 | 0 | 267 | 16 | 4 | 1 | 53 | 27.5 |
| | | | | | 2 | 44 | 25.1 |
| 6 | 8 | 267 | 16 | 4 | 1 | 145 | 86.0 |
| | | | | | 2 | 150 | 91.0 |
| 7 | 8 | 267 | 8 | 7 | 1 | 150 | 94.6 |
| | | | | | 2 | 150 | 88.3 |
| | | | | | 3 | 190 | 102.0 |

EXAMPLE VI

A continuous crystallization operation was undertaken by preparing an inventory of properly pre-conditioned crystal inoculum slurry and a supply of pregnant aluminum sulfate liquor of the same composition as that employed in preparing the inoculum slurry.

A normal batch-type crystallization was conducted initially to build-up a sufficient volume of slurry within the crystallizer vessel. Thereafter continuous crystallization was instituted by feeding both pregnant liquor and the previously prepared seed inoculum in a ratio of 9 to 1, respectively throughout a nine (9) hour period, during which time the crystal slurry was continuously withdrawn from the crystallizer at a corresponding volumetric rate.

At the end of nine (9) hours, the ratio of feed to seed was changed to 15 to 1 and operations were continued for six (6) more hours, with a corresponding change in the volume of slurry continuously withdrawn from the crystallizer.

At the end of the foregoing six (6) hour period, the total volume of feed per hour for both feed and seed were cut by one-half, as was the volume of withdrawals, and continuous crystallization was continued for six (6) additional hours.

Throughout the foregoing operations, periodic tests were conducted to determine the filtration rate and the resulting crystal weight, i.e., the relative filterability of the crystal products. The results of the entire operating cycle are presented in tabulated form below:

*Table VIII*

| Time (Hrs.)[1] | Filterability | |
|---|---|---|
| | Filtrate Volume[2] | Crystal Weight[3] (Grs.) |
| 0 (seed crystals) | 95 | 56 |
| 1.0 | 112 | 100 |
| 2.0 | 220 | 135 |
| 3.0 | 265 | 161 |
| 4.0 | 308 | 272 |
| 5.0 | 360 | 220 |
| 6.0 | 390 | 233 |
| CONTINUOUS OPERATIONS INITIATED HERE | | |
| 7.0 | 343 | 194 |
| 8.0 | 290 | 165 |
| 9.0 | 262 | 151 |
| 10.0 | 263 | 101 |
| 11.0 | 240 | 121 |
| 12.0 | 234 | 133 |
| 13.0 | 225 | 123 |
| 14.0 | 239 | 130 |
| FEED TO SEED RATIO CHANGED TO 15 TO 1 | | |
| 15.0 | 258 | 152 |
| 16.0 | 270 | 150 |
| 17.0 | 270 | 147 |
| 18.0 | 290 | 153 |
| 19.0 | 260 | 140 |
| 20.0 | 250 | 141 |
| 21.0 | 258 | 143 |
| RATE OF FEED REDUCED BY ONE-HALF | | |
| 22.0 | 242 | 144 |
| 23.0 | 250 | 136 |
| 24.0 | 224 | 122 |
| 25.0 | 230 | 123 |
| 26.0 | 210 | 108 |
| 27.0 | 226 | 109 |
| 28.0 | 209 | 106 |

[1] Hours after start of addition of main solution portion to seed crystals.
[2] Volume in cubic centimeters of filtrate obtained by immersing a filter of 0.1 ft.[2] surface area into the crystal slurry and applying a vacuum of 10 inches mercury for 15 seconds.
[3] Weight in grams of wet aluminum sulfate obtained under the conditions specified in (1) and (2).

As is readily apparent from the foregoing results, the crystallization process of the invention is ideally suited to continuous operations.

Having thus described the subject matter of my invention, what it is desired to secure by Letters Patent is:

1. In a process for the crystallization of aluminum sulfate from a pregnant liquor containing the same, the improvement that comprises effecting said crystallization by the controlled addition of said pregnant liquor at a temperature above approximately 54° C. and under conditions of constant agitation and cooling to a temperature within the range of from 7–43° C. onto an inoculum of crystals of the aluminum sulfate which have been pre-conditioned to provide substantially optimum filtration characteristics by aging the same for a period within the range of from 4–20 hours under conditions of constant agitation and at a temperature within the range of from 7–43° C.

2. In a process for the crystallization of aluminum sulfate from a pregnant liquor containing the same, the improvement that comprises effecting said crystallization by the controlled addition of said pregnant liquor at a temperature above approximately 54° C. and under conditions of constant agitation and cooling to a temperature within the range of from 26–33° C. onto an inoculum of crystals of the aluminum sulfate which have been pre-conditioned to provide substantially optimum filtration characteristics by aging the same for a period within the range of from 6–10 hours under conditions of constant agitation and at a temperature within the range of from 26–33° C.

3. In a process for the crystallization of aluminum sulfate from a pregnant liquor containing the same, the improvement that comprises effecting said crystallization by the controlled addition of from 80–95 percent by volume of said pregnant liquor at a temperature above approximately 54° C. and under conditions of constant agitation and cooling to a temperature within the range of from 7–43° C. onto an inoculum of crystals of the aluminum sulfate which have been pre-conditioned by treatment of the remaining 5–20 percent by volume of said pregnant liquor to provide substantially optimum filtration characteristics by aging the same for a period within the range of from 4–20 hours under conditions of constant agitation and at a temperature within the range of from 7–43° C.

4. In a process for the crystallization of aluminum sulfate from a pregnant liquor containing the same, the improvement that comprises effecting said crystallization by the controlled addition of from 80–95 percent by volume of said pregnant liquor at a temperature above approximately 54° C. and under conditions of constant agitation and cooling to a temperaure within the range of from 26–33° C. onto an inoculum of crystals of the aluminum sulfate which have been pre-conditioned by treatment of the remaining 5–20 percent by volume of said pregnant liquor to provide substantially optimum filtration characteristics by aging the same for a period within the range of from 6–10 hours under conditions of constant agitation and at a temperature within the range of from 26–33° C.

5. In a process for the crystallization of aluminum sulfate from a pregnant liquor containing the same, the improvement that comprises effecting said crystallization by the controlled addition of approximately 90 percent by volume of said pregnant liquor at a temperature above approximately 54° C. and under conditions of constant agitation and cooling to a temperature within the range of from 26–33° C. onto an inoculum of crystals of the aluminum sulfate which have been pre-conditioned by treatment of the remaining approximately 10 percent by volume of said pregnant liquor to provide substantially optimum filtration characteristics by aging the same for a period within the range of from 6–10 hours under conditions of constant agitation and at a temperature within the range of from 26–33° C.

6. In a process for the crystallization of normal aluminum sulfate hydrate of approximate composition: $[Al_2(SO_4)_3 \cdot 16-18H_2O]$ from a pregnant liquor containing the same, the improvement that comprises effecting said crystallization by the controlled addition of approximately 90 percent by volume of said pregnant liquor at a temperature above approximately 54° C. and under conditions of constant agitation and cooling to a temperature within the range of from 26–33° C. onto an inoculum of crystals of the aluminum sulfate which have been pre-conditioned by treatment of the remaining approximately 10 percent by volume of said pregnant liquor to provide substantially optimum filtration characteristics by aging the same for a period within the range of from 6–10 hours under conditions of constant agitation and at a temperature within the range of from 26–33° C.

7. In a process for the crystallization ot normal aluminum sulfate hydrate of approximate composition: $[Al_2(SO_4)_3 \cdot 16-18H_2O]$ from a pregnant liquor containing the same, the improvement that comprises effecting said crystallization by the controlled addition at a rate within the range of from 5–20 volume percent per hour of approximately 90 percent by volume of said pregnant liquor at a temperature above approximately 54° C. and under conditions of constant agitation and cooling to a temperature within the range of from 26–33° C. onto an inoculum of crystals of the aluminum sulfate which have been pre-conditioned by treatment of the remaining approximately 10 percent by volume of said pregnant liquor to provide substantially optimum filtration characteristics by aging the same for a period within the range of from 6–10 hours under conditions of constant agitation and at a temperature within the range of from 26–33° C.

8. The improved process as claimed in claim 7, that further comprises washing the crystallized product with an aqueous solution of sulfuric acid of concentration within the range of from approximately 30–50 percent by weight of sulfuric acid to remove entrained impurities contained therein, and separating and recovering the purified crystals from the wash solution.

9. The improved process as claimed in claim 7, that further comprises washing the crystallized product with an aqueous solution of sulfuric acid of concentration of approximately 46 percent by weight of sulfuric acid to remove entrained impurities contained therein, and separating and recovering the purified crystals from the wash solution.

10. Process for the crystallization of aluminum sulfate from a pregnant sulfuric acid solution of the same that comprises, treating a minor fraction of said solution by aging the same for a period within the range of from 4–20 hours under conditions of constant agitation and at a temperature within the range of from 7–43° C. to effect the production of an inoculum slurry of aluminum sulfate crystals possessing desirable filtration characteristics, passing the remainder of said pregnant solution at a controlled rate and at a temperature above approximately 54° C. onto said inoclum crystals under conditions of constant agitation and cooling to a temperature within the range of from 7–43° C. to effect crystallization of the aluminum sulfate therefrom, and separating and recovering the resulintg crystals from the residual mother liquor.

11. Process for the crystallization of aluminum sulfate from a pregnant sulfuric acid solution of the same that comprises, treating a minor fraction of said solution by aging the same for a period within the range of from 6–10 hours under conditions of constant agitation and at a temperature within the range of from 26–33° C. to effect the production of an inoculum slurry of aluminum sulfate crystals possessing desirable filtration characteristics, passing the remainder of said pregnant solution at a controlled rate and at a temperature above approximately 54° C. onto said inoculum crystals under conditions of constant agitation and cooling to a temperature within the range of from 26–33° C. to effect crystallization of the aluminum sulfate therefrom, and separating and recovering the resulting crystals from the residual mother liquor.

12. Process for the crystallization of aluminum sulfate from a pregnant sulfuric acid solution of the same that comprises, treating a minor fraction comprising from 5–20 percent by volume of said solution by aging the same for a period within the range of from 4–20 hours under conditions of constant agitation and at a temperature within the range of from 7–43° C. to effect the production of an inoculum slurry of aluminum sulfate crystals possessing desirable filtration characteristics, passing the remaining 80–95 percent by volume of said pregnant solution at a controlled rate and at a temperature above approximately 54° C. onto said innoculum crystals under conditions of constant agitation and cooling to a temperature within the range of from 7–43° C. to effect crystallization of the aluminum sulfate therefrom, and separating and recovering the resulting crystals from the residual mother liquor.

13. Process for the crystallization of normal aluminum sulfate hydrate of approximate composition:

$$[Al_2(SO_4)_3 \cdot 16{-}18H_2O]$$

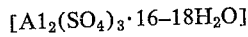

from a pregnant sulfuric acid solution of the same that comprises, treating approximately 10% by volume of said solution by aging the same for a period within the range of from 6–10 hours under conditions of constant agitation and at a temperature within the range of from 26–33° C. to effect the production of an inoculum slurry of aluminum sulfate crystals possessing desirable filtration characteristics, passing the remaining approximately 90 percent by volume of said pregnant solution at a controlled rate and at a temperature above approximately 54° C. onto said inoculum crystals under conditions of constant agitation and cooling to a temperature within the range of from 26–33° C. to effect crystallization of normal aluminum sulfate hydrate therefrom, and separating and recovering the resulting crystals from the residual mother liquor.

14. Process for the crystallization of normal aluminum sulfate hydrate of approximate composition:

$$[Al_2(SO_4)_3 \cdot 16{-}18H_2O]$$

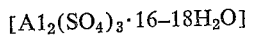

from a pregnant sulfuric acid solution of the same that comprises, treating approximately 10% by volume of said solution by aging the same for a period within the range of from 6–10 hours under conditions of constant agitation and at a temperature within the range of from 26–33° C. to effect the production of an inoculum slurry of aluminum sulfate crystals possessing desirable filtration characteristics, passing the remaining approximately 90% by volume of said pregnant solution at a rate within the range of from 5–20 volume percent per hour and at a temperature above approximately 54° C. onto said inoculum crystals under conditions of constant agitation and cooling to a temperature within the range of from 26–33° C. to effect crystallization of normal aluminum sulfate hydrate therefrom, and separating and recovering the resulting crystals from the residual mother liquor.

15. The process as claimed in claim 14, that further comprises the step of washing said normal aluminum sulfate hydrate crystals with an aqueous solution of sulfuric acid of concentration of approximately 46 percent by weight of sulfuric acid to remove entrained impurities contained therein, and separating and recovering the purified crystals from said wash solution.

16. Process for the crystallization of acid aluminum sulfate of approximate composition:

$$[Al_2(SO_4)_3 \cdot H_2SO_4 \cdot 12H_2O]$$

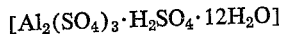

from a pregnant sulfuric acid solution of the same that comprises, treating a minor fraction comprising from 5–20% by volume of said solution by aging the same for a period within the range of from 4–20 hours under conditions of constant agitation and at a temperature within the range of from 7–43° C. to effect the production of an inoculum slurry of acid aluminum sulfate crystals possessing desirable filtration characteristics, passing the remaining 80–95% by volume of said pregnant solution at a controlled rate and at a temperature above approximately 54° C. onto said inoculum crystals under conditions of constant agitation and cooling to a temperature within the range of from 7–43° C. to effect crystallization of the acid aluminum sulfate therefrom, and separating and recovering the resulting crystals from the residual mother liquor.

17. Process for the continuous crystallization of aluminum sulfate from a pregnant sulfuric acid solution of the same that comprises, treating a portion of said pregnant solution by aging the same for a period within the range of from 4–20 hours under conditions of constant agitation and cooling to a temperature within the range of from 7–43° C. to produce a supply of crystal inoculum slurry possessing desirable filtration characteristics, charging a portion of said crystal inoculum slurry to a crystallizer vessel, adding additional quantities of said pregnant sulfuric acid solution at a temperature above approximately 54° C. directly onto said inoculum slurry within the crystallizer vessel at a controlled rate and under conditions of constant agitation and cooling to a temperature within the range of from 7–43° C. to effect crystallization of aluminum sulfate therefrom, thereafter effecting continuous additions of said pregnant solution and said crystal inoculum to the crystallizer vessel in a ratio within the range of from approximately 4–19 to 1, respectively, while simultaneously withdrawing an equivalent volume of crystal slurry from said crystallizer vessel, and treating the crystal slurry as withdrawn to effect separation of said crystals from the residual mother liquor.

References Cited in the file of this patent

UNITED STATES PATENTS 2,951,743     Kretzchmar _____ Sept. 6, 1960
2,958,580     Loevenstein _____ Nov. 1, 1960

OTHER REFERENCES

Saeman et al.: Ind. and Eng. Chem., vol. 44, pages 1912 to 1914, August 1952.

Saeman: A.I. Ch. E. Journal, March 1956, vol. 2, pages 107 to 112.